(12) United States Patent
Arnold et al.

(10) Patent No.: US 8,672,402 B1
(45) Date of Patent: *Mar. 18, 2014

(54) REMOVABLE NET BASKETS FOR CHILD CAR SEATS

(71) Applicants: Aletha Arnold, Smyrna, TN (US); Bettye Arnold, Murfreesboro, TN (US)

(72) Inventors: Aletha Arnold, Smyrna, TN (US); Bettye Arnold, Murfreesboro, TN (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/624,450

(22) Filed: Sep. 21, 2012

Related U.S. Application Data

(62) Division of application No. 12/870,325, filed on Aug. 27, 2010, now Pat. No. 8,272,686.

(51) Int. Cl.
*A47C 7/62* (2006.01)

(52) U.S. Cl.
USPC ............ 297/188.14; 297/188.01; 297/188.06; 297/188.18; 297/188.2

(58) Field of Classification Search
USPC ............ 297/188.01, 188.06, 188.14, 188.18, 297/188.2; 24/30.5 R, 543, 346; 248/99
See application file for complete search history.

(56) References Cited

U.S. PATENT DOCUMENTS

| | | | |
|---|---|---|---|
| 199,507 A | 1/1878 | Brubaker | |
| 463,964 A | 11/1891 | Gates | |
| 1,738,557 A * | 12/1929 | Beiling | 248/694 |
| 1,875,107 A | 8/1932 | Mueller | |
| 2,061,302 A * | 11/1936 | Egler | 297/188.18 |
| 2,462,973 A * | 3/1949 | Kelrick | 248/101 |
| 2,904,237 A | 9/1959 | Wasyluk | |
| 2,965,344 A * | 12/1960 | Baker | 248/101 |
| 3,175,743 A | 3/1965 | Richard | |
| 3,522,922 A * | 8/1970 | Byron et al. | 248/101 |
| 3,986,649 A | 10/1976 | Heimstra | |
| 4,238,868 A | 12/1980 | Sternberg | |
| 4,376,502 A * | 3/1983 | Cohen | 224/411 |
| 4,411,300 A | 10/1983 | Rico | |
| 4,550,440 A * | 10/1985 | Rico | 383/33 |

(Continued)

FOREIGN PATENT DOCUMENTS

WO    2010052820    10/2010

OTHER PUBLICATIONS

Side-Rider. Datasheet. OneStepAhead (R), Earliest customer review date: Jun. 8, 2005, retrieved on Dec. 1, 2010, retrieved from http://www.onestepahead.com/catalog/product.jsp?productId=308781.

*Primary Examiner* — Laurie Cranmer
(74) *Attorney, Agent, or Firm* — Brian S. Steinberger; Law Offices of Brian S. Steinberger, P.A.

(57) ABSTRACT

Devices, apparatus and methods of assembling and mounting a removable net basket on hoops/rings that can be attached to armrests on child car seats. Two hoops can sandwich a rim end of a tubular net/mesh material. The hoops can be located with one within the other and have snapable bendable fasteners that snap into like slots. The bottom end of the tubular mesh material can be closed off by sandwiching a pair of elongated strips together, with the strips having mateable enlarged heads that pass through slots such as cross shaped slots. The mesh/net bag can be removed by reversing the assembly. The assembled hoops can be hunger by a hanger onto an armrest of a juvenile car seat so that items, such as but not limited to beverage holders, food stuffs, toys and the like, can be placed therein.

7 Claims, 6 Drawing Sheets

(56) References Cited

U.S. PATENT DOCUMENTS

| | | | |
|---|---|---|---|
| 4,629,233 A * | 12/1986 | Pfisterer | 294/214 |
| 4,805,858 A | 2/1989 | Taylor | |
| 4,865,732 A * | 9/1989 | Garrant et al. | 210/232 |
| 4,934,637 A | 6/1990 | Guerrera | |
| 5,038,982 A * | 8/1991 | Salveson | 224/42.11 |
| 5,102,225 A * | 4/1992 | Hollinger et al. | 383/23 |
| 5,199,678 A * | 4/1993 | Luebke | 248/311.2 |
| 5,655,739 A * | 8/1997 | Teh-Wah Goo | 248/101 |
| 5,820,210 A * | 10/1998 | Shipman et al. | 297/188.01 |
| 5,836,553 A * | 11/1998 | Bergaila | 248/99 |
| 5,913,496 A * | 6/1999 | Valdez | 248/99 |
| 5,927,800 A * | 7/1999 | Stallworth | 297/188.08 |
| 6,082,897 A | 7/2000 | Galomb | |
| 6,149,229 A * | 11/2000 | Dillon et al. | 297/188.2 |
| 6,334,562 B1 | 1/2002 | Ament | |
| 6,371,642 B1 * | 4/2002 | Nelson et al. | 383/23 |
| 6,401,996 B1 | 6/2002 | Thom | |
| 6,416,023 B1 * | 7/2002 | Satsky | 248/99 |
| 6,488,241 B1 * | 12/2002 | Kyte et al. | 248/95 |
| D475,198 S * | 6/2003 | Kim | D3/306 |
| D480,296 S | 10/2003 | Scola | |
| 6,679,462 B1 * | 1/2004 | Valdez | 248/99 |
| 7,284,791 B1 * | 10/2007 | Wright | 297/188.18 |
| 7,377,411 B1 | 5/2008 | Stewart | |
| 7,530,537 B2 * | 5/2009 | Kandah | 248/99 |
| 7,703,723 B1 * | 4/2010 | Cooper et al. | 248/97 |
| 8,088,279 B2 * | 1/2012 | McInnis et al. | 210/170.03 |

* cited by examiner

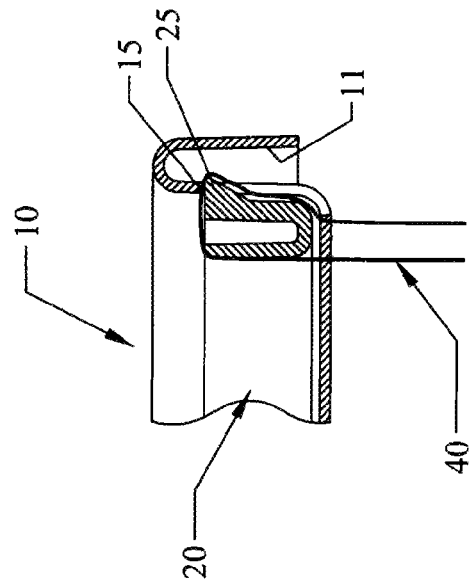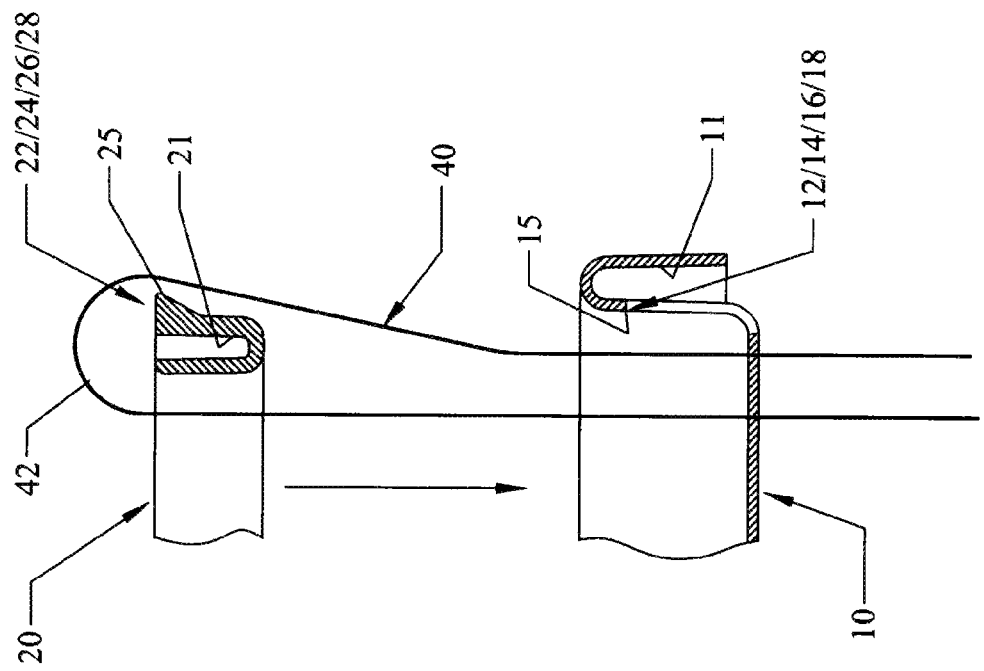

REMOVABLE NET BASKETS FOR CHILD CAR SEATS

CROSS REFERENCE TO RELATED APPLICATIONS

This application is a divisional of U.S. patent application Ser. No. 12/870,325 filed Aug. 27, 2010, now U.S. Pat. No. 8,272,686 issued Sep. 25, 2012. The entire disclosure of the application listed in this paragraph are incorporated herein by specific reference thereto.

FIELD OF INVENTION

This invention relates to carriers and holders for children, in particular to devices, apparatus and methods of assembling and mounting a removable net basket on hoops/rings that can be attached to armrests on child car seats.

BACKGROUND AND PRIOR ART

Children such as toddlers and small children will often drop various items such as toys, beverage holders (such as bottles), foodstuffs and trash when they are seated in cars seats since there is usually no location for the items to be supported and held. A drink holder is usually too small and is not large enough to hold such items. Often these items become deposited on the adjacent seats and floor of a vehicle. This can become a messy result since loose food stuff and liquids will often damage fabric type seat surfaces and carpeted floors of the vehicle.

Various types of devices which require fixed baskets with hook ends have been proposed over the years. See for example, U.S. Pat. No. 1,875,107 to Mueller; U.S. Pat. No. 2,904,237 to Wasyluk; U.S. Pat. No. 3,175,743 to Richard; U.S. Pat. No. 3,986,649 to Heimstra; U.S. Pat. No. 4,376,502 to Cohen; U.S. Pat. No. 6,401,996 to Thom et al.; and U.S. Pat. No. 7,377,411 to Stewart. However, these devices require the entire basket to be removed if items such as food stuffs and liquid need to be cleaned from the baskets. Also, the solid structure of the devices means that the baskets take up a good amount of side space next to the devices, which may not be available next to children's car seats.

Various types of net holders have also been proposed. See for example, U.S. Pat. No. 463,964 to Gates and U.S. Pat. No. 6,334,562 to Ament et al. However, these netting devices cannot be easily attached to armrests of child car seats, and the netting cannot be easily changed if items such as food stuffs and liquid need to be cleaned from the baskets. Various types of clip type bag ring holders have also been disclosed. See for example U.S. Pat. No. 199,507 to Brubaker; U.S. Pat. No. 2,462,973 to Kelrick; U.S. Pat. No. 4,550,440 to Rico; U.S. Pat. No. 4,805,858 to Taylor; U.S. Pat. No. 4,934,637 to Guerrera; U.S. Pat. No. 6,488,241 to Kyte et al.; and U.S. Pat. No. D480,296 to Scola. However, most if not all of these devices do not fully secure the mouth edges of bag with the bag holding ring. So it is possible the bag may slip off the ring, the failure to secure along the entire upper edges of a bag that is to supported by the ring holder. Having the bags slip off would also not be desirable if the bag is holding items such as beverages and loose food stuffs. Also, many of these devices require assembling many components such as separate clips or plural nuts and bolts/screws in order to be used. Using multiple pieces to assemble the devices that require multiple metal and/or plastic parts can easily become expensive to manufacturers and ultimately require the devices to be costly and undesirable to the purchaser. Furthermore, small parts, such as nuts, bolts/screws, small clips, and the like can easily become a choking hazard if a child sitting next the device gains access to those small parts. Further, the extra time required to assemble the holders and replace bags over time would become tedious with use.

Thus, the need exists for solutions to the above problems with the prior art.

SUMMARY OF THE INVENTION

A primary objective of the present invention is to provide devices, apparatus and methods of securing pliable type bags to ring/hoop shaped holders where the pliable bags or net type baskets or net type baskets are fully secured along an entire upper edge rim.

A secondary objective of the present invention is to provide devices, apparatus and methods of securing pliable bags or net type baskets to ring/hoop shaped holders where, the holders can be easily and quickly opened and closed in order to change out the pliable bags or net type baskets when needed.

A third objective of the present invention is to provide devices, apparatus and methods of securing pliable bags or net type baskets to ring/hoop shaped holders where minimal parts are used so as to provide minimal manufacturing costs and be inexpensive for buyers.

A fourth objective of the present invention is to provide an devices, apparatus and methods of securing pliable bags or net type baskets to ring/hoop shaped holders where only two parts need to be used to form the both the double ring shaped holder and hanging clip.

A fifth objective of the present invention is to provide devices, apparatus and methods of securing pliable type bags to ring/hoop shaped holders which can be used to support various types of pliable bags and baskets, such as but not limited to netting type bags or solid paper bags or solid plastic type bags.

A sixth objective of the present invention is to provide devices, apparatus and methods of securing pliable bags or net type baskets to ring/hoop shaped holders that does not require any small parts, such as but not limited to screws/bolts, nuts, and other small pieces, that can become choking hazards to children.

A hangable hoop holder for supporting items therefrom, can include a first hoop having a first diameter with at least one first fastener formed thereon, a second hoop having a second diameter, the second diameter being smaller than the first diameter, the second hoop having at least one second fastener formed thereon, the first fastener being mateably attachable to the second fastener, a pouch shaped holder having an open rim end, and a bottom end, wherein the pouch shaped holder is secured along all of the rim end by being sandwiched between the first hoop and the second hoop, and a portion of the rim end being compressed and sandwiched between the first fastener and the second fastener, when the first fastener and the second fastener are mateably attached to one another, and a hanger attached to one of the first hoop and second hoop, wherein the hanger allows the pouch shaped holder that can be adapted to be supported on an armrest.

The hanger can be formed on one of the first hoop and the second hoop. The hanger can be molded on one of the first hoop and the second hoop. The hanger can be extruded with one of the first hoop and the second hoop.

The first formed fastener can be molded on the first hoop, and the second formed fastener can be molded on the second hoop. The first formed fasten on the first hoop can be formed by extrusion, and the second formed fastener on the second hoop can be formed by extrusion.

The first hoop with first formed fastener can be plastic, and the second hoop with second formed fastener can also be plastic. In an alternative embodiment, the first hoop with first formed fastener can be formed from metal, and the second hoop with second formed fastener can be formed from metal.

The first fastener can be a snapable and bendable clip with raised edge, and the second fastener can be a slot. Alternatively, the first fastener can be a slot, and the second fastener can be a snapable and bendable clip.

The first fastener can be located on an inner wall perimeter of the first hoop, and the second fastener can be located on an outer wall perimeter of the second hoop.

The first fastener includes can include four first fasteners generally equally spaced apart from one another about an inner wall perimeter of the first hoop, and the second fastener can include four second fasteners generally equally spaced apart from one another about an outer wall perimeter of the second hoop.

The pouch shaped holder is a mesh bag with openings through a net material. In some applications pouch shaped holder can also be a paper bag. In some applications, the pouch shaped holder can be a plastic bag with contiguous sides, having no openings therethrough.

The novel holder can also include a pair of elongated strips that are snapable together, so that the bottom end of the pouch shaped holder is closed off by being sandwiched between the elongated strips when they are fastened together.

A preferred embodiment of a hangable hoop holder for supporting items therefrom, can include a first plastic hoop having a first diameter with a plurality of first fasteners formed on an inner wall of the first hoop with the first fasteners each substantially equally spaced apart from one another, a second plastic hoop having a second diameter, the second diameter being smaller than the first diameter, the second hoop having a plurality of second fasteners formed on an outer wall of the second hoop with the second fasteners each substantially equally spaced apart from one another, the first fasteners being mateably attachable to the second fasteners, a pouch shaped holder having an open rim end, and a bottom end, wherein the pouch shaped holder is secured along all of the rim end by being sandwiched between the first hoop and the second hoop, and a portion of the rim end being compressed and sandwiched between the first fasteners and the second fasteners, when the first fasteners and the second fasteners are mateably attached to one another, and a plastic hanger formed on one of the first hoop and second hoop, wherein the hangable hoop holder is limited to only three preformed parts, the preformed parts being formed from one of molding and extruding, wherein the hanger attaches the pouch shaped holder to adaptable to be hooked onto an armrest of a juvenile vehicle seat.

The hanger can be formed on the first outer hoop. The first fasteners and the second fasteners include snapable bendable clips that are mateably attachable to slots A novel method of securing and removing pouch shaped bags from hoop holders, can include the steps of providing a first plastic hoop having a first diameter, providing first fasteners preformed along an inner wall of the first hoop, the first fasteners being selected from snapable bendable clips and slots, providing a second plastic hoop having a second diameter that is smaller than the first diameter, providing second fasteners preformed along an outer wall of the second hoop, the second fasteners being selected from snapable bendable clips and slots, providing a pouch shaped holder having an open rim end and a bottom end, sandwiching all of the open rim end of the pouch shaped holder between the first hoop and the second hoop, snapably attaching the first fasteners together with the second fasteners so that portions of the bendable clips snap into the slots, so that all of the rim end of the pouch shaped holder is secured to the first hoop and the second hoop, unsnapping the first fasteners from the second fasteners; and removing the pouch shaped bag. If a tubular bag is used, an elongated pair of strips with mateable snapable fasteners and slots can compress together and form a bottom end of the bag.

In a preferred embodiment the net/mesh bags can be used along side of a juvenile car type seat where the hanger can hook onto the armrest of the juvenile car seat.

Further objects and advantages of this invention will be apparent from the following detailed description of the presently preferred embodiments which are illustrated schematically in the accompanying drawings.

BRIEF DESCRIPTION OF THE FIGURES

FIG. 3 is a side cross-sectional view of the separated double hoops of FIG. 2 with pliable net type basket, about to be secured thereto.

FIG. 4 is another cross-sectional view of the double hoops of FIG. 2 attached to another with the pliable net type basket, secured thereto.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 2:
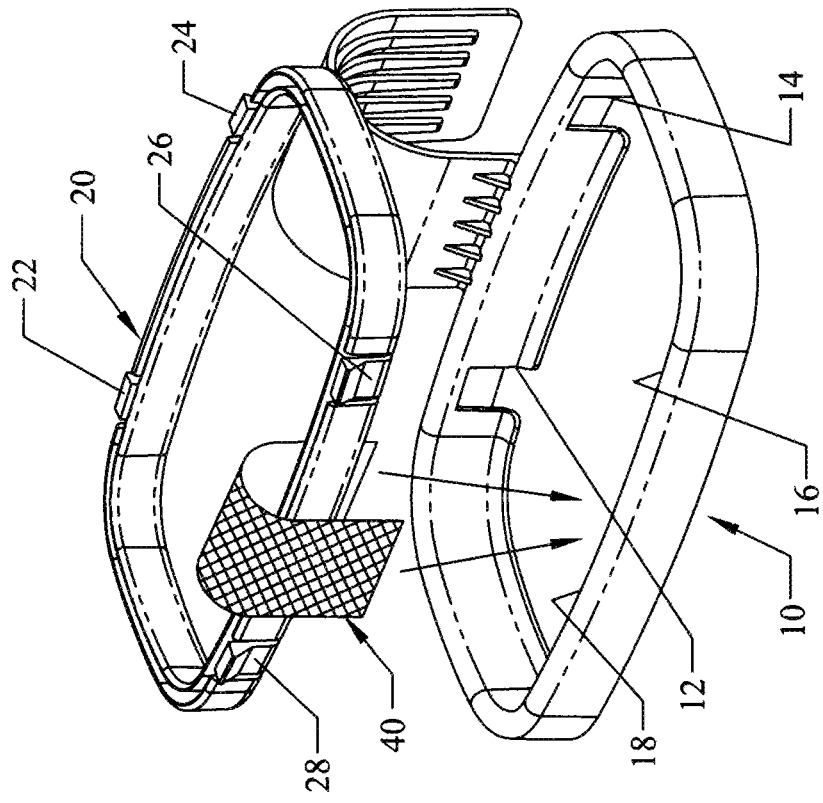
FIG. 2 is an exploded view of the double hoops of the holder of FIG. 1 with the pliable net type basket about to be secured thereto.
Figure 1:
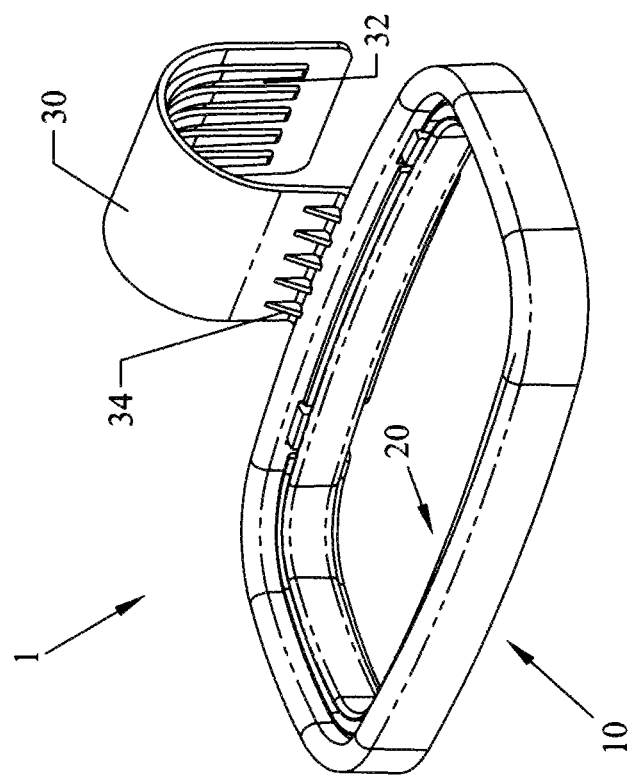
FIG. 1 is a perspective view of the novel double hoop pliable holder for pliable bags or net type baskets with hanging clip.

A description of the components will now be described.
1. Double hoops and formed on hanger.
10 First hoop (outer)
11. U-shaped channel
12, 14, 16, 18 First formed on fasteners (slots)
15. upper edge of slots
20. Second hoop (outer)
21. U-shaped channel
22, 24, 26, 28 Second formed on fasteners (snapable bendable fasteners)
25. Raised edge on fasteners
30. hanger formed on the outer hoop
32. inner strengthening ribs
34 outer strengthening ribs
40. pouch sheet material 42. rim end of pouch
48. bottom end(s) of pouch
50. first elongated bottom strip
55. snapable enlarged headed fastener(s)
60 second elongated bottom strip
65. slot (x-shaped) fasteners
70. Juvenile/child vehicle (car) seat
75 Armrest of seat FIG. 1 is a perspective view of the novel double hoop pliable holder 1 for pliable bags or net type baskets with hanging clip 30. FIG. 2 is an exploded view of the double hoops 10, 20 of the holder 1 of FIG. 1 with the pliable net type basket about to be secured thereto. FIG. 3 is a side cross-sectional view of the separated double hoops 10, 20 of FIG. 2 with pliable net type basket 40, about to be secured thereto. FIG. 4 is another cross-sectional view of the double hoops 10, 20 of FIG. 2 attached to another with the pliable net type basket 40, secured thereto.

Referring to FIGS. 1-4, the double hoop pliable holder 1 can include only three parts that include an outer plastic hoop 10, an inner plastic hoop 20 with a plastic hanger hook 30 that can be formed on the outer hoop 30, and a bag material 40. The inner plastic hoop 10 can be molded or extruded with a U-shaped inner channel 11. The inner wall of the outer hoop 10 can include molded or extruded on fasteners thereon, such as four snapable bendable fasteners 12, 14, 16, 18 that can be substantially equally spaced apart from one another, each with a raised edge 25. The second hoop 20 can be molded or extruded with a U-shaped channel 21. The outer wall of the inner loop 20 can include molded or extruded on mateable fasteners thereon, such as four slot fasteners 22, 24, 26, 28 in identical locations to the fasteners 12, 14, 16, 18 on the outer hoop 10. The outer hoop 10 can have a diameter between its inner wall side surfaces being slightly larger than a diameter of an outer wall side surface of the inner hoop 20 for a tight fit.

A mesh pouch material such as a net/mesh walls bag 40 can initially have a wall placed to be positioned between the outer hoop 10 and the inner hoop 20, and in a preferred embodiment can be double layered. The inner hoop 20 with walls of the mesh bag 40 draped over the top of the inner hoop 20 and can be dropped into the inside of the outer hoop 10, so that the mateable fasteners are adjacent to each other. In a preferred embodiment the mesh 40 can initially be a generally tubular shaped material having open upper and lower ends. The raised edges 25 of the inner loop fasteners 22, 24, 26, 28, can have inwardly sloped sides under the raised edges 25 so that the fasteners 22, 24, 26, 28 bend inward, and then snap back outward after passing the upper edge 15 of the slots 12, 14, 16, 18. The doubled layers of the bag walls can form a tight fit between the sandwiched concentric hoops 10, 20 that are sandwiched together.

A hanger 30 can be generally C or U shaped and be molded or extruded from an outer wall portion of the outer hoop 10. Strengthening ribs 32 can be located along a lower side of the hanger 30. Other strengthening ribs 34 can be located between an upper side of the outer hoop 10 and the hanger 30. The strengthening ribs/members can enhance the durability of the holder 1 so that the hanger 30 will not easily break off of the outer hoop 10. Although five raised inner rib members 32 and five raised outer rib members 34 are shown, the invention can be practiced with less or more rib members as needed. Alternatively, the hanger 30 can have a larger thickness so as to eliminate the need for the rib members 32, 34.

Figure 5:
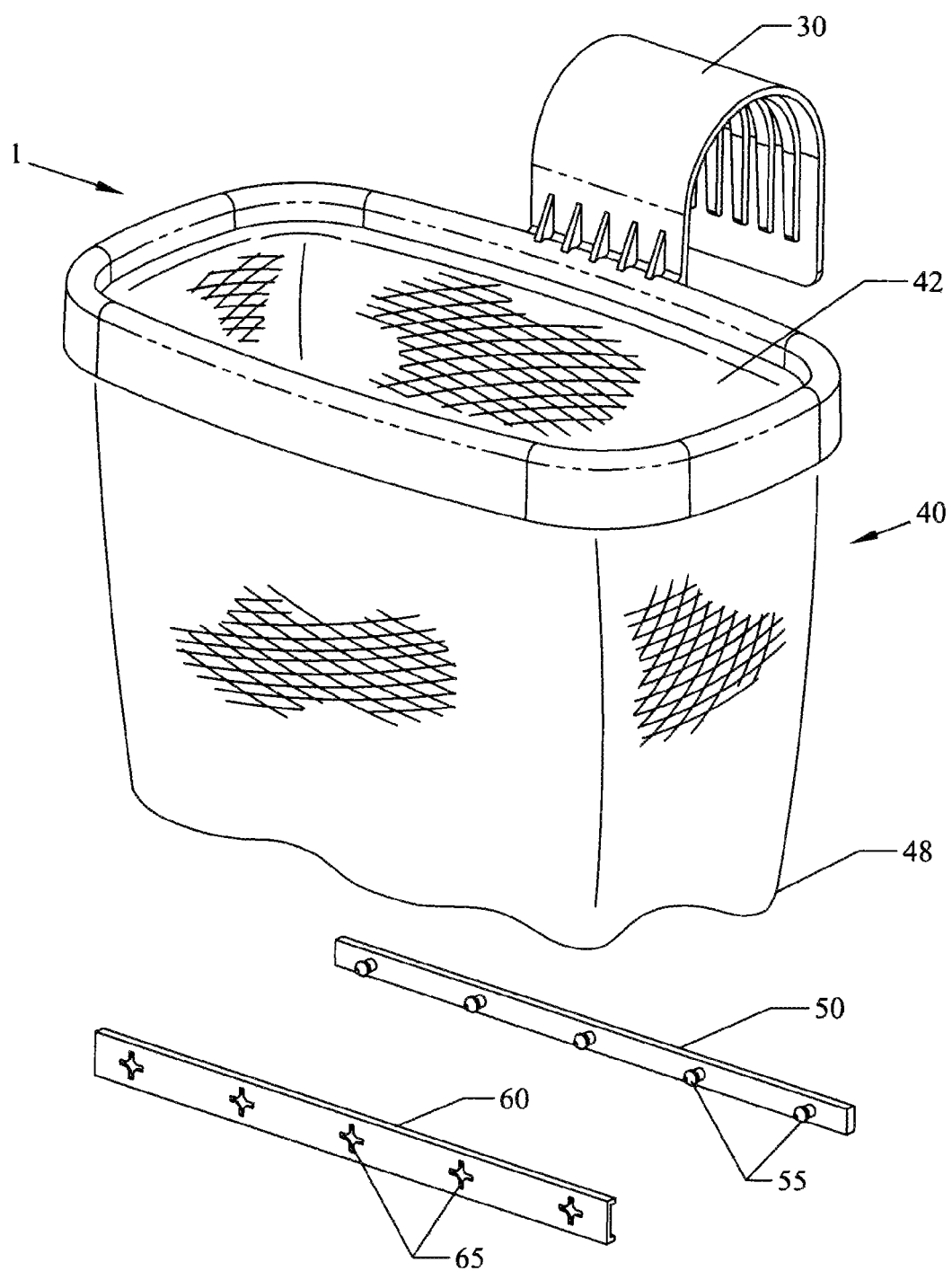
FIG. 5 is a perspective view of the assembled double hoop holder and secured pliable net type basket, with open bottom and separate pair of snapable closing strips.
Figure 6:
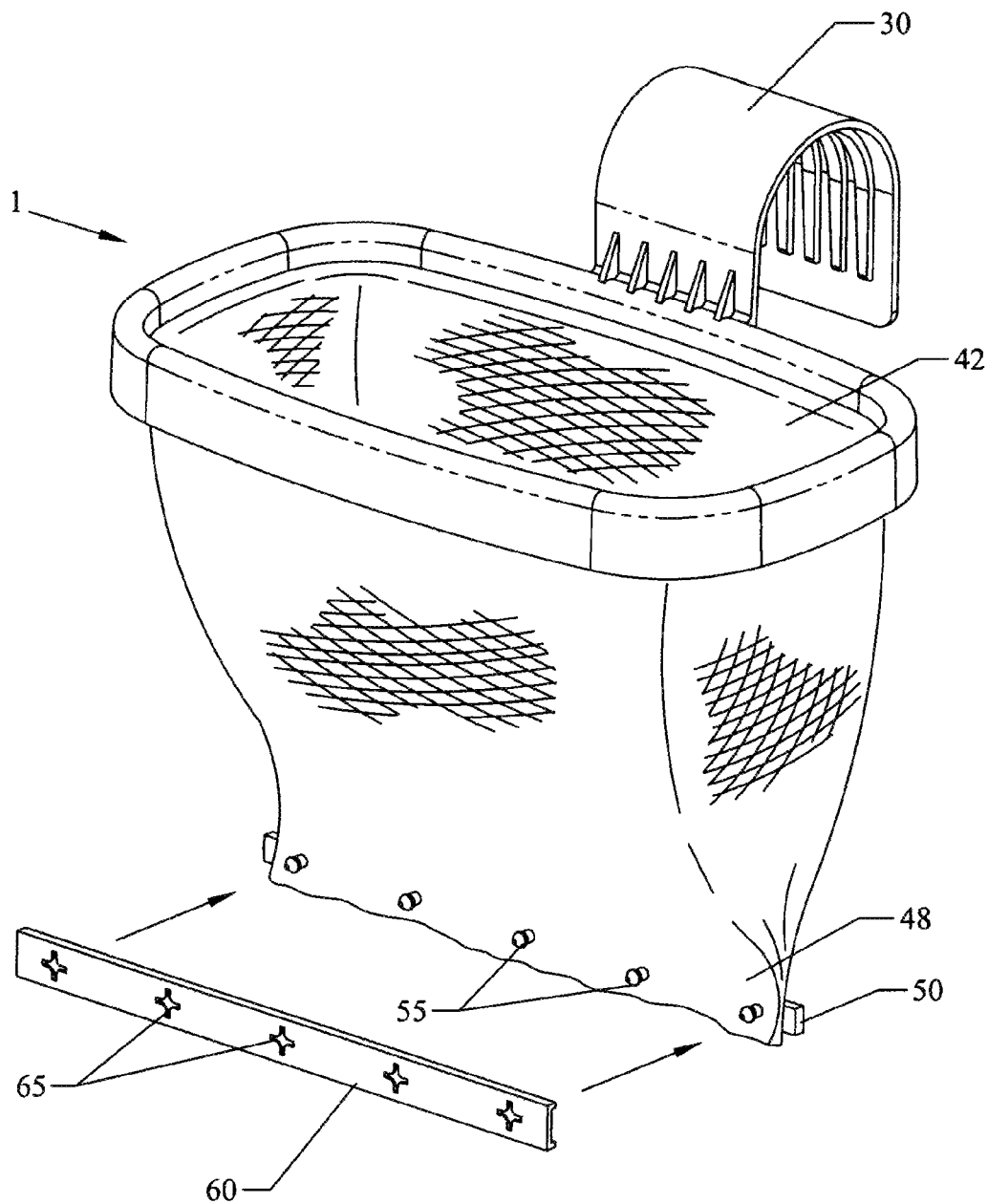
FIG. 6 is another perspective view of the assembled hoop holder with secured pliable net type basket, of FIG. 5 with snapable strips in place to close off an open bottom.
Figure 7:
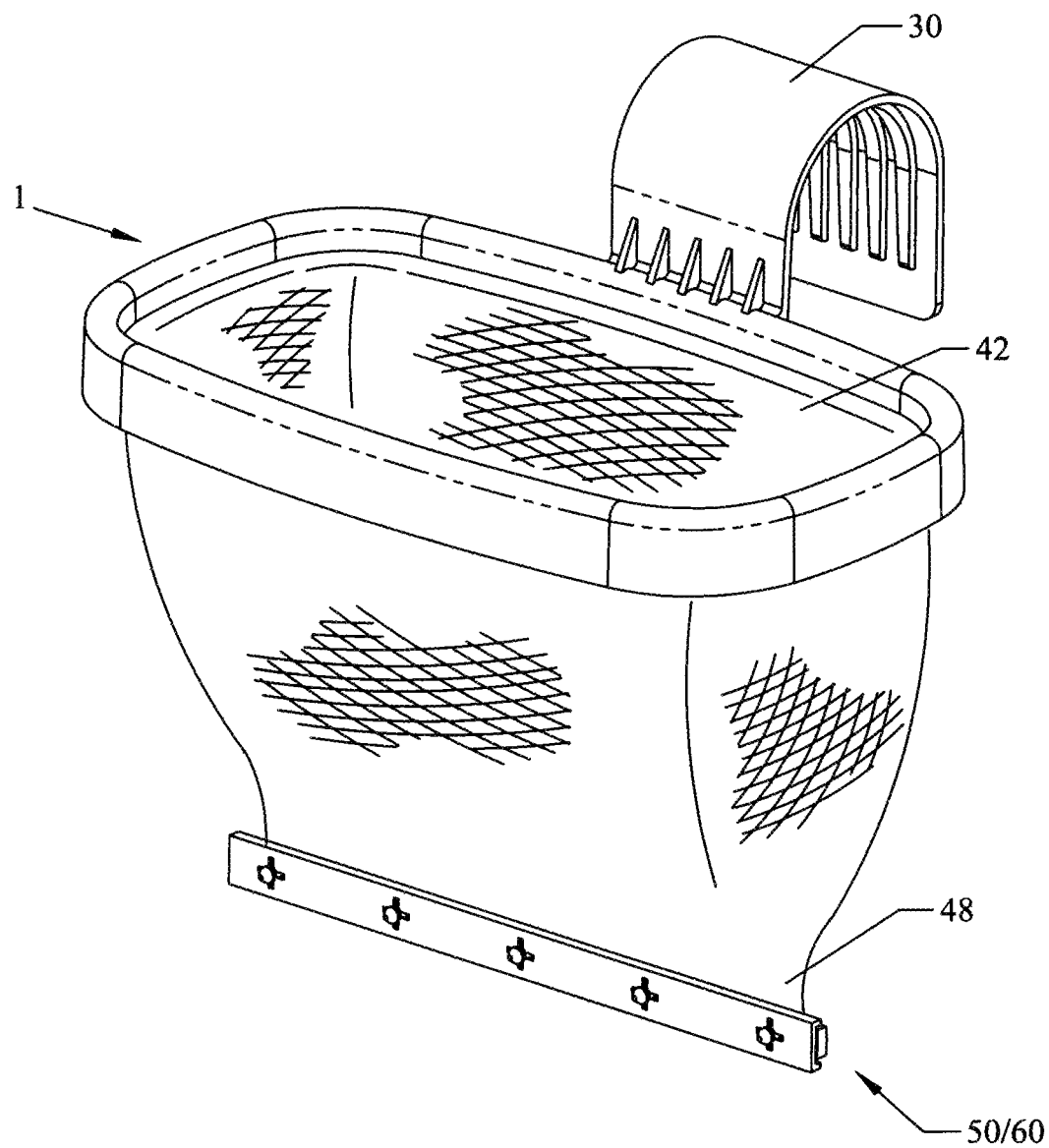
FIG. 7 is another perspective view of the assembled hoop holder with secured pliable net type basket, of FIG. 6 with bottom snapable strips in a closed position.

FIG. 5 is a perspective view of the assembled double hoop holder 5 and secured pliable net type basket 40, with open bottom 48 and separate pair of snapable closing strips 50, 60. FIG. 6 is another perspective view of the assembled hoop holder 1 with secured pliable net type basket 40, of FIG. 5 with snapable strips 50, 60 in place to close off the open bottom end 48. FIG. 7 is another perspective view of the assembled hoop holder 1 with secured pliable net type basket 40 of FIG. 6 with bottom snapable strips 50, 60 in a closed position.

Referring to FIGS. 5-7, after the upper rim end 42 of the pliable net basket 40 is secured, the open bottom end 48 can be closed off by the bottom elongated strips 50, 60. a first elongated strip 50 can have a rectangular band shape and include a plurality of raised tip fasteners 55, each having enlarged heads, with the strip 50 formed from molded plastic. The second elongated strip 60 can have a rectangular band shape and include a like number of a plurality of mateable slots, such as but not limited to being cross shaped with the strip 60 also formed from plastic. The enlarged heads of the fasteners 55 of on the first strip can be pushed through a bottom end 48 of one side of the open ended double layered bag and protrude through the other side of the double layered bag 40. Next, the enlarged heads on the raised fasteners can be pushed through the pliable slots 65 of the second strip, and be snapped when the enlarged heads pass to the other side of the second elongated strip 60.

Figure 8:
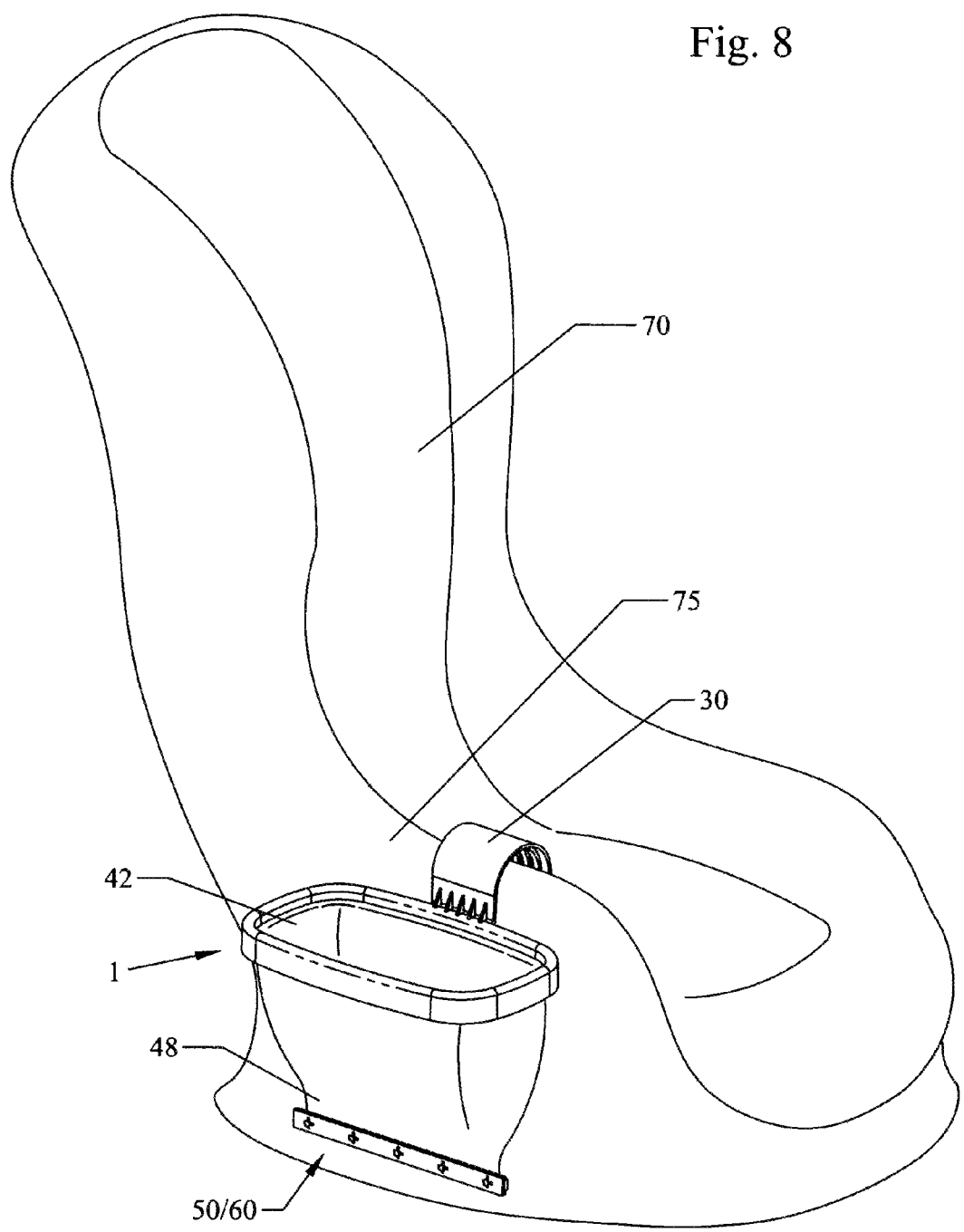
FIG. 8 shows the assembled hoop holder with secured pliable net type basket, of FIG. 5 with closed off bottom, with the holder hooked to an arm rest of a child car seat.

FIG. 8 shows the assembled hoop holder 1 with secured pliable net type basket 40, of FIG. 5 with closed off bottom end 48, with the holder 1 hooked by hanger 30 to an arm rest 75 of a child car seat 70. A child (not shown) can easily place items, such as but not limited to beverages in bottles, and the like, and loose foodstuff into the basket bag 40, and limit any spilling therefrom. Also, the pliable basket 40 can easily hold other items, such as but not limited to holding toys, and the like in an easily reachable location to the child seated in the seat 75.

The basket bag 40 can be removed from the holder 1, by prying apart the inner hoop 20 from the outer hoop 10, by manually pushing from the raised edge(s) 25 of the bendable clips 22, 24, 26, 28 that are in the respective slots 12, 14, 16, 18 toward the inner hoop 20. For example, in FIG. 4 a finger or fingers of an installer can be inserted into the channel 11 of the outer loop to reach the raised edge 25 on the fasteners 22, 24, 26, 28 of the inner loop 20. Next, the bottom strips 50, 60 can similarly be pried apart from one another. Once the hoops 10 and 20 are separated and the strips 50, 60 are separated the bag material 40 can be removed and can be cleaned or thrown out or replaced. For example, other pouch type holders such as paper and plastic wall bags with contiguous side walls can be reattached to the double hoops 10, 20 instead of the mesh/net bags 40. The size of the three main components 10, 20, 40 would not become a choking hazard for a child if they become separated from one another. Also, while solid contiguous bags, such as a plastic bag can be misused and placed over the head of a child to potentially suffocate the child, the mesh type openings in the net bag 40 if placed over the head of a child would allow for breathing and not suffocate the child.

Although, the preferred embodiment in the figures show pliable net type basket, the invention can be initially used to support other types, of bags such as pliable plastic contiguous walled bags, paper bags, and the like. In other applications, such as with adult chairs, the novel invention can use the contiguous walled paper and plastic bags.

Although, the preferred embodiment shows snapable clips on the inner hoop and mateable slots on the outer loop, the invention can be practiced with snapable clips on the outer hoop and mateable slots on the inner loop. Additionally, the invention can be practiced with snapable clip(s) and mateable slot(s) interspersed on each hoop.

While the preferred embodiment shows four molded on snap clips and four mateable slots, the invention can be practiced with less or more clips and slots. Alternatively, a single elongated clip about substantially all of the inner wall surface of the outer hoop and mateable elongated slot on the outside of the inner hoop can be used, as well.

Although the preferred embodiment shows the hanger hook formed on the outer hoop, the hanger hook can be formed on the inner hoop. Alternatively, the hanger hook can include a first portion formed on the outer hoop and a second portion formed on the inner hoop, wherein both portions are attachable together.

Although the preferred embodiment is described as using molded plastic parts with snap clip(s) and mateable slot(s) molded thereon, the invention can be formed from extruded material, and the like.

While the bottom of the pliable net basket is shown with a removable snapable securing strips, the bottom can be alternatively sewn closed. Alternatively, the bottom can have snap type fasteners. Alternatively, the bottom can have other fasteners, such as zippers and the like.

Although the preferred embodiment is described as using plastic parts with snap clip(s) and mateable slot(s) other materials, such as but not limited to metal, and the like, with the snap clip(s) and mateable slot(s) shaped or preformed into the metal type parts. Additionally, the invention can be practiced with one hoop being plastic and the other hoop being metal, so that two hoops formed from dissimilar materials are used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A hangable hoop holder for supporting items therefrom, comprising:
    a plastic hoop that includes an inner hoop with at least one first fastener formed thereon, and an outer hoop having at least one second fastener formed thereon, the at least one first fastener being mateably attachable to the at least one second fastener, the outer hoop having a larger diameter than the inner hoop;
    a pouch shaped bag having a closed bottom and upper end attached to the hoop;
    a single plastic hanger having a C shape molded to the outer hoop;
    outer parallel raised plastic strengthening members formed on contiguous surfaces between the outer hoop and the plastic hanger; and
    inner parallel raised plastic strengthening members formed on an inner side of the plastic hanger, wherein both the outer parallel raised plastic strengthening members and the inner parallel raised plastic strengthening members enhance durability of the hanger so that the hanger will not easily break off from the plastic hoop, wherein the hanger hangs the pouch shaped bag to be adaptable to be supported on an armrest.

2. The hangable hoop holder of claim 1, wherein the pouch shaped bag is a mesh bag.

3. A hangable hoop holder for supporting items therefrom, consisting of:
    a hoop consisting of an inner hoop and an outer hoop being mateably attachable together with fasteners, the outer hoop having a larger diameter than the inner hoop;
    a pouch shaped bag attached to the hoop; and
    a hanger formed on the outer hoop, with inner parallel strengthening members formed on an inner side of the hanger to enhance durability of the hanger so that the hanger will not easily break off from the hoop, and with outer parallel raised plastic strengthening members formed on contiguous surfaces between the outer hoop and the hanger, wherein the hangable hoop holder is adaptable to be hooked onto an armrest of a juvenile vehicle seat.

4. The hangable hoop holder of claim 3, wherein the pouch shaped bag is a mesh bag.

5. The hangable loop holder of claim 3, wherein the hoop, hanger and strengthening members are formed from plastic.

6. A method of securing and removing pouch shaped bags from hoop holders, comprising the steps of:
    providing a plastic hoop comprising an inner hoop and an outer hoop, which are mateably attachable and detachable from one another with fasteners, the outer hoop having a larger diameter than the inner hoop;
    providing a plastic hanger having a C shaped configuration to be formed onto the outer hoop of the plastic hoop;
    providing inner parallel plastic strengthening ribs formed on an inner side of the plastic hanger to enhance durability of the hanger so that the hanger will not easily break off from the plastic hoop;
    providing outer parallel plastic strengthening ribs formed on contiguous surfaces between the outer hoop and the plastic hanger to enhance durability of the hanger so that the hanger will not easily break off from the plastic hoop;
    attaching a pouch shaped bag to the hoop; and
    hanging the C shaped hanger onto a arm rest of a seat.

7. The method of claim 6, wherein the pouch shaped bag is a mesh bag.

* * * * *